United States Patent [19]
Weinhold

[11] 4,093,283
[45] June 6, 1978

[54] DEVICE FOR RELEASABLY FASTENING TUBE OR PIPE ENDS

[76] Inventor: Karl Weinhold, Um Jagdfeld 43, 4040 Neuss, Germany

[21] Appl. No.: 744,090

[22] Filed: Nov. 22, 1976

[30] Foreign Application Priority Data

Nov. 27, 1975 Germany .................. 2553189

[51] Int. Cl.² ................................ F16L 33/12
[52] U.S. Cl. .................... 285/243; 285/365
[58] Field of Search .......... 285/243, 252, 365, 409, 285/373, 419

[56] References Cited

U.S. PATENT DOCUMENTS

| | | | |
|---|---|---|---|
| 3,113,791 | 12/1963 | Frost et al. | 285/373 X |
| 3,206,230 | 9/1965 | Weinhold | 285/243 X |
| 3,272,536 | 9/1966 | Weinhold | 285/243 X |
| 3,396,993 | 8/1968 | Weinhold | 285/243 X |
| 3,476,410 | 11/1969 | Pastva, Jr. | 285/365 X |
| 3,828,403 | 8/1974 | Perrin et al. | 285/365 X |
| 3,866,956 | 2/1975 | Weinhold | 285/243 |
| 3,979,143 | 9/1976 | Weinhold | 285/243 |

FOREIGN PATENT DOCUMENTS

| | | | |
|---|---|---|---|
| 2,051,987 | 4/1972 | Germany | 285/243 |
| 2,005,588 | 8/1971 | Germany | 285/243 |
| 1,425,581 | 11/1968 | Germany | 285/243 |

*Primary Examiner*—Werner H. Schroeder
*Assistant Examiner*—Conrad L. Berman
*Attorney, Agent, or Firm*—Spencer & Kaye

[57] ABSTRACT

A device for releasably fastening tube or pipe ends comprises a plurality of shell parts pivotally connected together to form, when closed, an annular shell, the shell parts having radially inwardly directed flanges for retaining the tube or pipe ends within the annular shell and a toggle lever lock connecting two adjacent shell parts which have ends in engagement when closed, the toggle lever lock comprising a toggle lever connected pivotally to one of the engageable ends of the shell parts and extending along the other of the two adjacent shell parts when the device is closed and a spring lying between the toggle lever and the said other adjacent shell part in engagement with the said other adjacent shell part and the toggle lever and loaded in when the device is closed.

14 Claims, 6 Drawing Figures

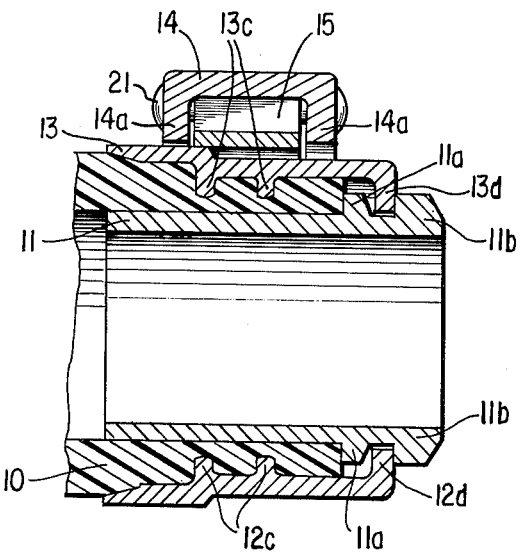
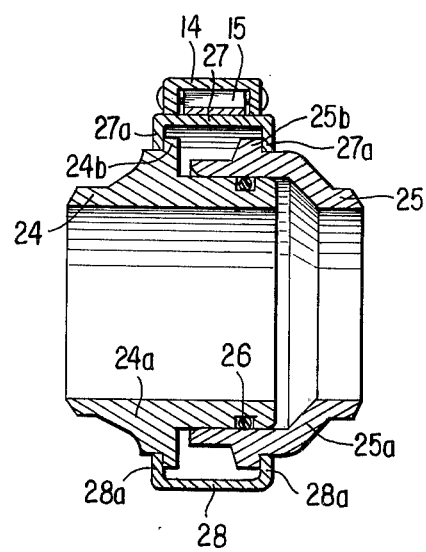
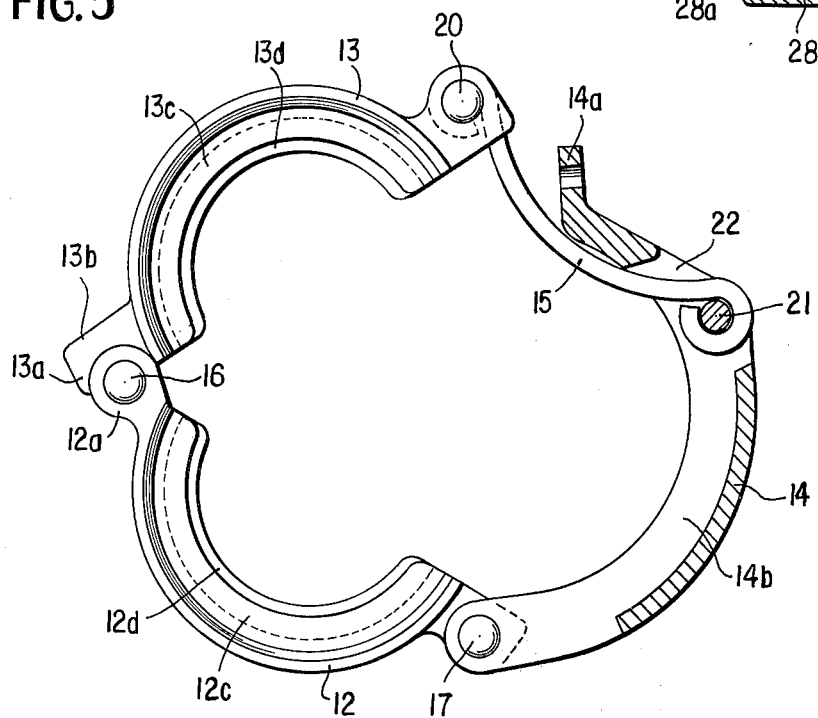

DEVICE FOR RELEASABLY FASTENING TUBE OR PIPE ENDS

BACKGROUND OF THE INVENTION

The invention relates to a device for releasable fastening of tube or pipe ends, said device having shell parts connected pivotably together and having flanges directed radially inwards on the shell parts, to retain tube or pipe ends. Such a device may have a toggle lever lock, through which two adjacent shell parts may be connected together, and which has a toggle lever and a spring connected jointly to the latter and its toggle lever engages one end of the first of two shell parts in a pivotable manner.

In such a device, it is known to allow the spring to engage with its end relatively close to the pivot axis of the toggle lever, while the spring itself engages over the point of engagement between the two adjacent shell parts and is connected to a part remote from the end of the other shell part, this fastening takes place usually by hooking the appropriately bent end of the spring into a slit in this shell part. When the toggle lever is open, the spring may be unhooked so that the shell may be unfolded. When closing the toggle lever, the pivot axis formed between the toggle lever and spring is pivoted over into its closed position via that pivot axis with which the toggle lever is held pivotably against the shell part assigned to it. In this closed position, it rests on the shell part last mentioned. In order that the toggle lever is able to reach this position over dead centre, the spring must be capable of expansion.

In particular, because of the required expansibility of the spring, the contact pressure which may be achieved with the flanges of the shell parts cannot have very large values. If a tube under very high pressure is to be fastened with the device, the sealing effect to be achieved by the flanges may, in some cases, be insufficient; in other words the loadability of the device is not sufficiently high.

Furthermore, the spring must have a curve bent in a particular manner in order that the required expansibility is ensured. However, this curve in turn demands a fairly large rigidity of the spring. As a result manufacture is more expensive.

Another disadvantage of the known embodiment may be seen by the fact that the spring is exposed with respect to the otherwise enclosed shape of the shell parts and forms an unprotected region within which foreign bodies and dirt may penetrate into the inside of the device.

SUMMARY OF THE INVENTION

It is an object of the invention to provide a device for releasably fastening tube or pipe ends in which some or all of the above problems are obviated or substantially reduced.

According to the invention, there is provided a device for releasably fastening tube or pipe ends comprising a plurality of shell parts pivotally connected together and forming an annular shell in a closed position of the device, radially inwardly directed flanges on said shell parts for retaining the tube or pipe ends within said annular shell, a toggle lever lock connecting two adjacent shell parts having ends in engagement in said closed position of the device, a toggle lever for said toggle lever lock pivotally connected to an engaged end of one of said two shell parts and extending along the other of said two shell parts in the closed position of the device and a spring for said toggle lever lock lying in said closed position of the device, between said toggle lever and said other of said two shell parts, engaging said engaged end of said other of said two shell parts and said toggle lever and loaded in said closed position of the device.

Further according to the invention, there is provided a device for releasably fastening tube or pipe ends comprising first and second shell parts pivotally connected together at one end and engageable at their other ends in a closed position of the device to form an annular shell, radially inwardly directed flanges on said shell parts for retaining the tube or pipe ends within said annular shell, a toggle lever lock connecting said first and second shell parts at their said other ends, a toggle lever for said toggle lever lock pivotally connected to said other end of said first shell part and extending along said second shell part in the closed position of the device and a spring for said toggle lever lock lying, in said closed position of the device, between said toggle lever and said second shell part, engaging said other end of said second shell part and said toggle lever and loaded in said closed position of said device.

Still further according to the invention, there is provided a releasable tube fastening device comprising a pipe section with an outer cylindrical surface onto which the end of the tube is pushed, first and second shell parts pivotally connected together at one end and engageable at their other ends, in a closed position of the device, to form an annular shell surrounding said pipe section, radially inwardly directed flanges arranged on said shell parts in a central region thereof for pressing the tube end against said pipe section to retain the tube end on said pipe section, a toggle lever lock connecting said first and second shell parts at their said other ends, a toggle lever for said toggle lever lock pivotally connected to said other end of said first shell part and extending along said second shell part in the closed position of the device and a spring for said toggle lever lock lying, in said closed position of the device, between said toggle lever and said second shell part, engaging said other end of said second shell part and said toggle lever and loaded in said closed position of the device.

BRIEF DESCRIPTION OF THE DRAWINGS

The invention will now be described in greater detail, by way of example, with reference to the drawings, in which:

FIG. 4 shows a longitudinal section through the device;

FIG. 5 shows a section corresponding to the view according to FIG. 1 when the device is open;

FIG. 6 shows an application of the device as a pipe connection.

DESCRIPTION OF THE PREFERRED EMBODIMENTS

Figure 1:
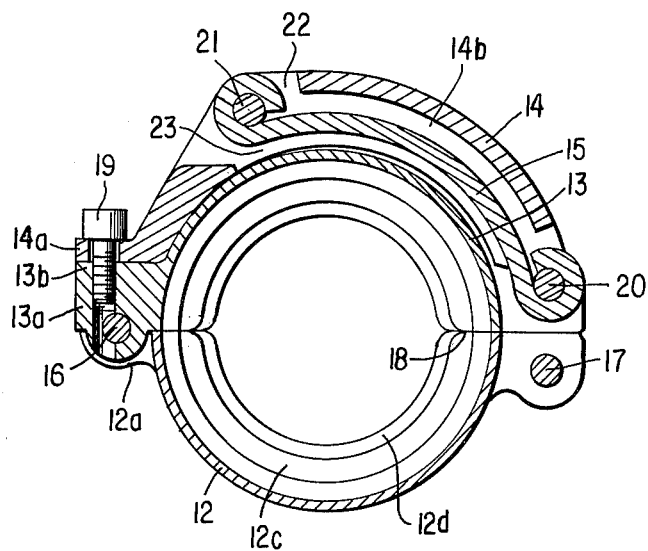
FIG. 1 shows a cross section through one form of the device in accordance with the invention.

In a preferred embodiment of the invention, it is proposed, in a releasable fastening device of the kind referred to at the outset, that the toggle lever engaging one end of the first of the two shell parts in a pivotable manner should extend beyond the point of engagement between the two shell parts on to the second shell part when the device is closed. It is further proposed that the spring should run between the toggle lever and the second shell part and should engage the end of the second shell part which is adjacent to the first shell part and that the spring should be pressure loaded when the device is closed.

While the spring extended beyond the point of engagement between the shell parts to be connected in known embodiments, the situation now exists for the toggle lever. Its pivotable point of connection at the end of the first shell part lies so far away from the point of engagement of the spring at the end of the second shell part adjacent to the first shell part that there is a position over dead-centre before the final closed position of the toggle lever. In the closed position, one end of the spring pushes the end of the second shell part assigned to it in the direction of the adjacent end of the first shell part which end is held via the toggle lever and the pressure loaded spring.

In the proposed embodiment, a substantially larger radial contact force may be achieved with the device. The spring, now pressure loaded, may have a flat curve which approximately matches the diameter assigned to the circumference of the device. For this reason, the spring may also be manufactured with a fairly large cross section and this in turn facilitates an appropriate increase in the spring force. Moreover, the spring is now substantially completely covered by the toggle lever so that an enclosed constructional shape is achieved even in this region.

Another advantage is that the spring, in opening or closing the device, no longer has to be unhooked or hooked into one shell part. The end of the spring which is connected to the shell part may be fastened, for example, by means of a rivet or a bolt, because, as a result of the proposed arrangement, when the device is open, there is a substantially larger inner diameter even if the spring remains connected to the shell part assigned to it.

A quite special advantage is that because of the new arrangement of the spring, the constructional shape of the shell parts may be the same.

The length of the spring may be such that it extends over the second shell part from its point of engagement with the second shell part within an angle range between 90° and 150°.

The toggle lever may have an approximately U-shaped cross section, wherein the spring is fastened to the toggle lever by means of an axle mounted on radial side members of the toggle lever.

Furthermore, it is proposed that the toggle lever should have a recess in that region in which the spring is fastened to it through which recess, a clearance located between the fastening axis and the second shell part is accessible. Through this clearance, a screwdriver or a similar tool may be pushed below the fastening axis, in order to make opening easier, whereby the toggle lever may be raised easily.

Furthermore it is proposed that the free end of the toggle lever should be secured in its closed position by means of a bolt engaging the shell part lying thereunder. Thus, it is advisable if the second shell part has a bearing cam with a bearing surface in the region in which the end of the toggle lever is supported when the device is closed, the bearing surface being parallel to the diametral plane of the device running through the point of engagement and the end of the toggle lever angled appropriately in an outward direction bears on the bearing surface. It is also advisable for the toggle lever to be secured by means of a bolt which may be screwed into the bearing cam.

In order to make it easier to raise the toggle lever, the bearing cam may be narrower axially of the device than the end of the toggle lever itself so that the latter extends beyond the barrier with lateral gripping edges.

With respect to fastening a tube end, there is an advantage as a result of the invention in as much as it is now also possible, because of the increase in the contact pressure, to push the tube end onto a pipe section having a cylindrical external surface and thus to achieve a very high sealing effect. Previously, it was always necessary to use a nozzle provided with annular toruses in order to adjust the said nozzle with respect to the shell parts so that a flange respectively gripped the tube from outside directly behind the nozzle.

In a further refinement of the invention it is however now possible, when using the device for fastening a tube end to push the same onto a pipe section having a cylindrical outer surface and thus to arrange the flanges pressing the tube end against the pipe section in the central region of the shell parts. In its regions extending outwardly from the flanges, the tube is so held thereby and clamped that no damage can occur as a result of too large a shearing load owing to penetration of the flanges.

Thus, there is not only the advantage that the above stated adjustment between the shell parts and the pipe section is no longer required, but also the fact that the pipe section is cheaper and simpler in manufacture than a nozzle provided with toruses.

Furthermore, it is advantageous if the region of the pipe section on which the tube end is pushed on is limited by an outer annular collar and if a flange arranged at the edge of the shell parts engages behind this annular collar. As a result, the tube end and the shell parts may be secured in the direction in which the tube end is removed.

The shell parts may, moreover, be so dimensioned that they have a flange free portion on their side facing the cylindrical surface of the pipe section, the internal radius of which is slightly larger than the internal radius in the remaining region of the shell parts between and near the flanges.

Referring now to the drawings, there is shown a device designed for fastening a tube end 10 onto a pipe section 11. The device has, in particular, a first shell part 12 and a second shell part 13, these each extending respectively over 180° of the circumference. A toggle lever 14 and a spring 15 form a toggle lever lock.

The two shell parts 12 and 13 are connected together on one side by means of a pivot bolt 16 the ends of which are held by arms 12a of the first shell part, one arm 13a of the second shell part 13 lies between the two arms 12a so that the pivot bolt 16 is able to penetrate all three arms 12a and 13a.

On the opposite side, the toggle lever 14 is fastened in a pivotable manner by means of a pivot bolt 17 on the first shell part 12. The toggle lever 14 extends beyond the point of engagement 18 between the two shell parts 12 and 13 and approximately beyond the entire circumference of the second shell part 13. The end 14a of the toggle lever is provided with a bore which is angled outwardly and lies on a bearing cam 13b of the second shell part 13.

Figure 2:
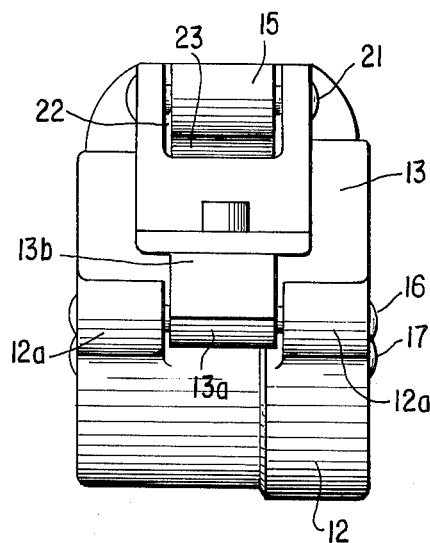
FIG. 2 shows a side view of the device shown in FIG. 1.
Figure 3:
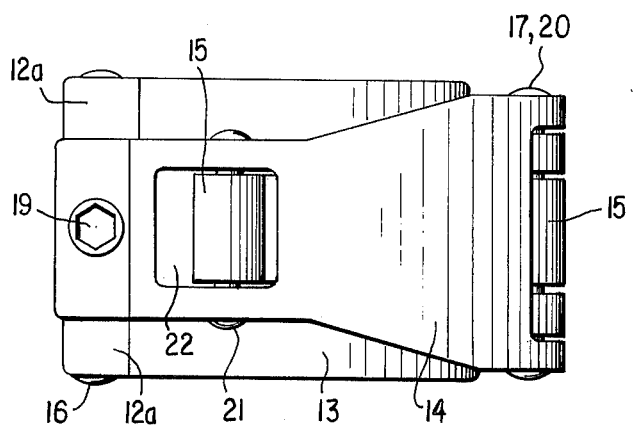
FIG. 3 shows a plan view onto the device.

The bearing cam 13b is so formed that on its upper side a bearing surface is formed for the end 14a of the toggle lever 14, this bearing surface lying parallel to that diametral plane of the device which runs through the point of engagement 18. A bolt 19 penetrating the bore at the end 14a of the toggle lever 14 serves to secure the toggle lever 14 in the closed position shown here and is screwed into the bearing cam 13b. The latter is moreover narrower than the end 14a of the toggle lever 14 so that the edges of the toggle lever 14 projecting beyond the bearing cam 13b may engage well during operation (FIG. 2).

At the end of the second shell part 13 facing the point of impact 18, the spring 15 is held by means of a further pivot bolt 20 while the other end of the spring is fastened in a pivotable manner, by means of a pivot bolt 21, onto the toggle lever 14. The spring 15 has a curved path matched to the appropriate diameter of the device at this point and extends in the space located between the second shell part 13 and the toggle lever 14. Moreover, this space has a U-shaped cross section having edge parts 14b extending radially in which the ends of the pivot bolt 17 and the pivot bolt 20 are held. In the region of the pivot bolt 21, the centre of the toggle lever 14 is provided with a recess 22 which is so dimensioned that a clearance 23 is accessible for example by means of a screwdriver pushed in between the spring 15 and second shell part 13. By applying a screwdriver at this point, the toggle lever 14 may be easily pressed upwards.

As may be seen particularly from FIG. 4, the two shell parts 12 and 13 respectively have flanges 12c and 13c projecting radially inwards which are arranged at a certain spacing from one another in the central region of the length provided for pushing on the tube end 10. This length is delimited by an annular collar 11a on the pipe section 11. A third flange 12d and 13d on the shell parts 12 and 13 extends from the outer edge of thereof inwardly so that the annular collar 11a may be engaged from behind. Thus, the device can be secured against removal of the larger cylindrical pipe section 11. The device may also be fixed directly with respect to the pipe section 11 in the thrust direction by means of a further annular collar 11b.

On the side facing the cylindrical surface of the pipe section 11, the shell parts 12 and 13 have a slightly larger inside internal diameter than in the region which extends between the flanges 12c or 13c and up to flanges 12d or 13d. The tube end 10 is therefore already clamped to a certain extent or pressed together in the region of the larger internal diameter before the actual effect of the flanges 12c and 13c begins.

The device described has the following mode of operation:

If the toggle lever 14 is raised after removing the screw 19 then it moves from the position shown in FIG. 1 into the position shown in FIG. 5. As a result, a position is achieved in which the pivot bolts 17, 20 and 21 are located on a straight line. This is then the dead centre position. By further opening of the toggle lever 14, the spring 15 is unloaded more and more. Such a large degree of opening of the device may be achieved that the tube end 10 may be comfortably pushed on or removed. If the toggle lever 14 is again brought into its closed position then the spring 15 is loaded increasingly by means of pressure. In the dead centre position the largest pressure is achieved which however is only reduced to a relatively small extent up to the final closed position. Because of the shape of the spring 15, and because of its points of fixed engagement with the toggle lever 14 and with the second shell part 13, the ends of the shell parts 12 and 13 coinciding at the point of engagement 18 are pressed together wherein the pressing force initiated by the spring 15 becomes effective with its force component running tangentially, while, in contrast, the radial force component is relatively small.

In the present case, the spring 15 extends over an angle range of approximately 120°. In order to produce the required pressing force, only an insignificant deformation path is necessary with appropriately selected spring rigidity and appropriate cross section.

The toggle lever may also serve as a guide and serve to adjust the ends of the shell parts to be connected, circumferentially, because the toggle lever may be so constructed that it engages both over the first shell part to which it is fixed in a pivotable manner, and also over the second shell part at least in the region of the shell part ends to be connected. As a result, these are safely prevented from becoming offset with respect to one another axially, when the device is closed.

As may be seen from FIG. 5, a relatively large opening angle of the device may be achieved if the connection between the toggle lever 14 and the spring 15 as well as the shell parts 12 and 13 remain closed, i.e., that, for example, the spring 15 is not detachable by unhooking one end. Furthermore, it may be seen that the recess 22 also fulfills the purpose of creating as large a pivot range as possible for the spring 15 so that the front part of the toggle lever 14 fits largely into the concave arch of the spring 15 in the open position of the device.

FIG. 6 shows a modified embodiment of the device which now serves to connect two pipe ends 24 and 25. The pipe end 24 has a plug member 24a and an annular collar 24b on its outer circumference. The other pipe end 25 has a socket member 25a with an annular seal 26 let into it. Likewise, on the outside an annular collar 25b is formed.

Two shell parts 27 and 28 are now provided which are connected together and to the toggle lever 14 and the spring 15 in the same manner as in the previously described embodiment. However, the two shell parts 27 and 28 only have two inwardly projecting flanges 27a or 28a on their outer sides with which flanges they engage behind the annular collar 24b and 25b. As a result, when the device is closed, the pipe ends 24 and 25 are prevented from being pulled apart.

It will be understood that the above description of the present invention is susceptible to various modification changes and adaptations.

What is claimed is:

1. A device for releasably fastening tube or pipe ends comprising a plurality of shell parts pivotally connected together and forming an annular shell in a closed position of the device, radially inwardly directed flanges on said shell parts for retaining the tube or pipe ends within said annular shell, a toggle lever lock connecting two adjacent shell parts having ends in engagement in said closed position of the device, a toggle lever for said toggle lever lock pivotally connected to an engaged end of one of said two shell parts and extending along the other of said two shell parts in the closed position of the device and a spring for said toggle lever lock lying, in said closed position of the device, between said toggle lever and said other of said two shell parts, engaging said engaged end of said other of said two shell parts and said toggle lever and loaded in said closed position of the device.

2. A device as defined in claim 1, and comprising fixed pivot means at opposite ends of said spring for connecting said ends of said spring pivotally to said toggle lever and said other of said two shell parts respectively.

3. A device for releasably fastening tube or pipe ends comprising first and second shell parts pivotally connected together at one end and engageable at their other ends in a closed position of the device to form an annular shell, radially inwardly directed flanges on said shell parts for retaining the tube or pipe ends within said annular shell, a toggle lever lock connecting said first and second shell parts at their said other ends, a toggle lever for said toggle lever lock pivotally connected to said other end of said first shell part and extending along said second shell part in the closed position of the device and a spring for said toggle lever lock lying, in said closed position of the device, between said toggle lever and said second shell part, engaging said other end of said second shell part and said toggle lever and loaded in said closed position of said device.

4. A device as defined in claim 3, wherein said toggle lever extends to said one end of said second shell part in the closed position of the device.

5. A device as defined in claim 4, wherein said spring extends from its point of engagement with said second shell part along said second shell part over an angle between 90° and 150°.

6. A device as defined in claim 4, wherein said toggle lever comprises a member of an approximately U-shaped cross section with an axle mounted on its radial side members by means of which said spring is connected to said toggle lever.

7. A device as defined in claim 6, wherein said toggle lever defines a recess in a region containing said axle and for providing access to a clearance between said axle and said second shell part.

8. A device as defined in claim 4, and comprising a bolt device for securing the free end of said toggle lever in its closed position by engagement with said second shell part.

9. A device as defined in claim 8, and comprising a bearing cam on said second shell part defining a bearing surface in that region in which said free end of said toggle lever rests when the device is closed, with said bearing surface parallel to a diametral plane of the device running through the point of engagement of said other ends of said first and second shell parts and on which surface said free end of said toggle lever rests; and a bolt for screwing into said bearing cam for securing said toggle lever.

10. A device as defined in claim 9, wherein said bearing cam is narrower than said free end of said toggle lever in the direction of the axis of the device.

11. A releasable tube fastening device comprising a pipe section with an outer cylindrical surface onto which the end of the tube is pushed, first and second shell parts pivotally connected together at one end and engageable at their other ends, in a closed position of the device, to form an annular shell surrounding said pipe section, radially inwardly directed flanges arranged on said shell parts in a central region thereof for pressing the tube end against said pipe section to retain the tube end on said pipe section, a toggle lever lock connecting said first and second shell parts at their said other ends, a toggle lever for said toggle lever lock pivotally connected to said other end of said first shell part and extending along said second shell part in the closed position of the device and a spring for said toggle lever lock lying, in said closed position of the device, between said toggle lever and said second shell part, engaging said other end of said second shell part and said toggle lever and loaded in said closed position of the device.

12. A device as defined in claim 11, and comprising a flange free portion of said first and second shell parts on their side facing the cylindrical surface of said pipe section for receiving the tube end with said flange free portion having a slightly larger inner radius than the inner radius of said first and second shell parts in the region of said flanges.

13. A device as defined in claim 11 and comprising an annular collar on said pipe section for limiting the pushing on of the tube end and an edge flange on each of said first and second shell parts engaging axially outwardly of said annular collar.

14. A device as defined in claim 13, and comprising a second annular collar outside of the first annular collar and defining, with said first annular collar, an annular groove for receiving said edge flanges.

* * * * *